United States Patent [19]

Copeland et al.

[11] Patent Number: 5,218,371
[45] Date of Patent: Jun. 8, 1993

[54] ANTENNA ARRAY FOR ENHANCED FIELD FALLOFF

[75] Inventors: Richard L. Copeland, Boca Raton; Markus B. Kopp, Pompano Beach, both of Fla.

[73] Assignee: Sensormatic Electronics Corporation, Deerfield Beach, Fla.

[21] Appl. No.: 567,149

[22] Filed: Aug. 14, 1990

[51] Int. Cl.$^5$ .................................... H01Q 11/12
[52] U.S. Cl. ........................... 343/742; 343/741; 343/867
[58] Field of Search ............... 343/741, 742, 841, 842, 343/866, 867, 855, 870; 340/551

[56] References Cited

U.S. PATENT DOCUMENTS

| Re. 26,196 | 4/1967 | Boyer | 343/742 |
|---|---|---|---|
| 1,712,023 | 5/1929 | Bernard | 343/867 |
| 3,534,372 | 10/1970 | Scheuerecher et al. | 343/742 |
| 4,326,198 | 4/1982 | Novikoff | 343/867 |
| 4,769,631 | 9/1988 | Copeland | 340/551 |
| 4,806,943 | 2/1989 | Doncel | 343/866 |
| 4,922,261 | 5/1990 | O'Farrell | 343/742 |

FOREIGN PATENT DOCUMENTS

| 564259 | 12/1923 | France | 343/866 |
|---|---|---|---|
| 654142 | 6/1951 | United Kingdom | 343/742 |
| 1307648 | 2/1973 | United Kingdom | 343/742 |

*Primary Examiner*—Rolf Hille
*Assistant Examiner*—Hoanganh Le
*Attorney, Agent, or Firm*—Robin, Blecker, Daley & Driscoll

[57] ABSTRACT

An antenna system comprises at least first and second antennas circumscribing a common center thereof at respective different distances from the common center, and circuitry for exciting the first antenna at a greater level than the second antenna, the excitation of the first and second antennas by such exciting circuitry being of respective opposite phasing. The excitation circuitry is operative to provide first fields adjacent the antenna system to a predetermined distance therefrom which are essentially controlled by the excitation of the first antenna and to provide for second fields beyond the predetermined distance which are of lesser strength than the first fields and are determined by both of the first and second antennas.

22 Claims, 6 Drawing Sheets

ANTENNA ARRAY FOR ENHANCED FIELD FALLOFF

FIELD OF THE INVENTION

This invention relates generally to antenna systems with controlled radiation patterns and pertains more particularly to improved antenna arrangements for use in providing enhanced field falloff.

BACKGROUND OF THE INVENTION

In various uses of propagated electromagnetic radiant energy, efficacy demands that the radiated energy pattern be controlled. By way of example, an application of particular interest in this respect to makers of electronic article surveillance (EAS) systems is that the radiated energy pattern be confined to a specific area under surveillance, such as an exit area of a retail facility. Thus, to the extent that a radiated energy pattern extends beyond such exit area, i.e., overranges and thus fails to adequately fall off beyond a desired physical limit, the extended area cannot be used for such as article display purposes, since displayed articles in the extended area bearing EAS tags will be subject to alarm activity on receiving the radiated energy pattern.

EAS efforts heretofore known have looked extensively to measures to control overranging, e.g., the use of shielding to confine the radiated pattern to a confined area under surveillance, the use of a capacitive, on-floor pad, disposed between transmitting and receiving antennas, and plural transmitting antennas aside a controlled area, each transmitting respective complemental parts of an EAS tag activating message.

Further, various efforts have been forthcoming as to antenna array configurations which ar said to effect control of overranging.

A classic problem in EAS systems is thus that a transmitter antenna configuration that provides good EAS tag excitation may not pass stringent regulatory emission requirements. One solution, additional to those discussed above, is to lessen the field excitation level and bring the participating transmitting and receiving antennas more closely adjacent. This results in an essentially unmarketable system, i.e., not covering a desired extent of a controlled zone. Another avenue has been the use of a so-called "Figure-8" transmitting antenna, wherein the top and bottom coils are of opposed phase excitation. The limitation of the Figure-8 arrangement is, firstly, that the interrogation fields contain null zones which degrade detection sensitivity, and, secondly, that the the manner in which the distant fields cancel each other depends on how closely the geometric centers of the participating coils are disposed.

Turning to specific antenna designs of U.S. patents, U.S. Pat. No. 4,751,516 is quite specific to the center feeding of a two-loop transmitting antenna, U.S. Pat. No. 4,251,808 establishes as well-known an antenna having two outermost loops opposing a larger center loop, but requires the presence of a grounded shorted turn arrangement, wherein the cross-over shield portions are insulated from the shorted turn, e.g., as is seen at 60 and 62 in FIG. 5 thereof.

U.S. Pat. No. 4,260,990 calls for a transmitting antenna adapted for coupling to a transmitter and having at least one loop lying in a plane, a receiving antenna adapted for coupling to a receiver and having at least two twisted loops lying in a common plane, each loop being twisted 180 degrees and in phase opposition with each adjacent loop. The antennas have a different number of loops and a mutual magnetic coupling therebetween and the receiving antenna has an effective total loop area of one phase equal to the effective total loop area of opposite phase.

U.S. Pat. No. 4,243,980 relates to three twisted loops in each of the transmitting and receiving antenna systems.

U.S. Pat. No. 4,769,631 discloses a transmitter antenna configuration that is coaxial and coplanar, with inner and outer loops in additive phasing, using elliptical coils rotated with respect to each other to create a sheared field along the horizontal plane.

The antenna configuration of U.S. Pat. Nos. 4,510,489 and 4,510,490 is used hereinafter as a comparative base for the antenna system of the subject invention.

Other patents dealing with antenna structures of interest include French Patent No. 763,681, U.S. Pat. Nos. 2,597,518, 3,182,314, 4,135,183 and 4,859,991.

From applicants' viewpoint, none of the foregoing patents effectively addresses the problem of reducing distant field levels and, at the same time, not affecting the interrogation zone field levels in an appreciable manner.

SUMMARY OF THE INVENTION

The present invention has as its primary object the provision of antenna systems exhibiting enhanced field falloff.

A more general object of the invention is the provision of antenna arrays which exhibit enhanced control of radiated energy patterns.

In attaining the foregoing and other objects, the invention provides an antenna system, comprising at least first and second antennas circumscribing a common center thereof at respective different distances from the common center, and circuitry for exciting the first antenna at a greater level than the second antenna, the excitation of the first and second antennas by such exciting circuitry being of respective opposite phasing. The excitation circuitry is operative to provide first fields adjacent the antenna system to a predetermined distance therefrom which are essentially controlled by the excitation of the first antenna and to provide for second fields beyond the predetermined distance which are of lesser strength than the first fields and are determined by both of the first and second antennas.

As will be demonstrated hereinafter, the fields in the interrogation zone are mainly determined by the innermost coil(s) while the fields at a distance greater than the pedestal separation are determined by the interaction of all of the coils. It is shown that the condition for field reversal on axis (fields along center line pass through zero) can be made to occur at a predetermined distance from the array. It is shown conclusively that the fields along the axis of the coils are the dominant fields in the quasi-static near field electromagnetic limit ($d < \lambda/2\pi$) for a variety of loop array designs, where d is the distance from the observation point to the antenna center outside of the interrogation zone and $\lambda$ is the electromagnetic wavelength. Also, due to the symmetry of the coaxial antennas, the field fall off with distance is demonstrated to be much faster than that for the more common Figure-8 system.

Other objects and features of the invention will be further understood from the following detailed description of preferred embodiments and practices and from the drawings, wherein like reference numerals identify like parts and components throughout.

DETAILED DESCRIPTION OF PREFERRED EMBODIMENTS AND PRACTICES

Figure 2:
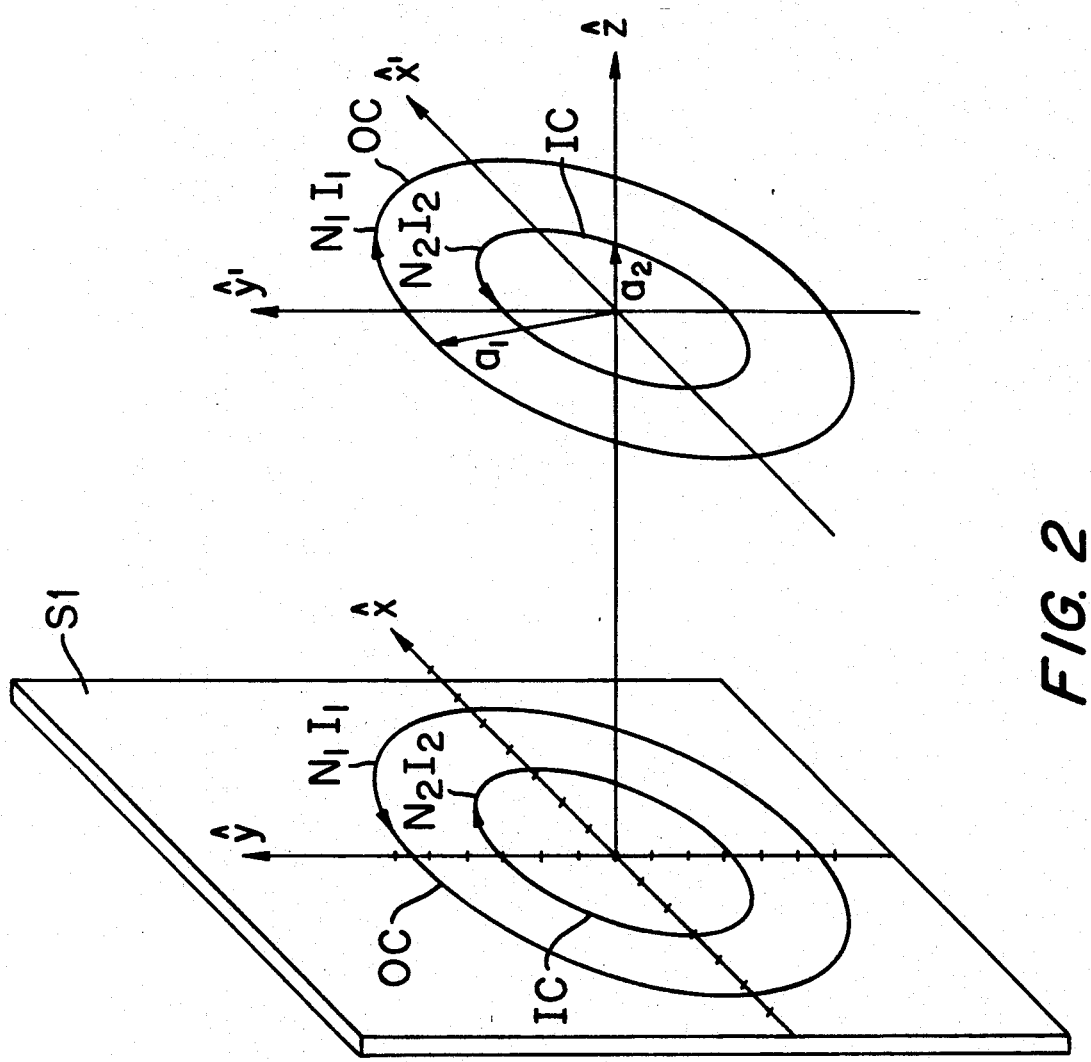
FIG. 2 is a schematic showing of the antenna system used in the FIG. 1 system.

By way of introduction to the invention, its analytical and theoretical basis is first discussed. It can easily be shown that the axial fields, Bz(z), for one array (two concentric circular coils) is given by:

$$Bz(z) = (u_o/2) \left[ \frac{(N_1 I_1) a_1^2}{(a_1^2 + Z^2)^{3/2}} + \frac{(N_2 I_2) a_2^2}{(a_2^2 + Z^2)^{3/2}} \right] \quad (1)$$

where, with reference to FIG. 2, $(N_1 I_1)$ is the excitation for the outer coil OC, $(N_2 I_2)$ is the excitation for the inner coil IC, $a_1$ is the radius RO of the outer coil, and $a_2$ is the radius RI of the inner coil, with the sense of I1 and I2 opposite in phase. The coils are preferably each constituted by a multi-turn electrical conductor. The condition for the field reversal on axis at distance z1 from the array is given by:

$$\frac{(N_1 I_1) a_1^2}{(a_1^2 + Z^2)^{3/2}} = \frac{(N_2 I_2) a_2^2}{(a_2^2 + Z^2)^{3/2}} \quad (2)$$

For realistic geometries, the inner loop area is about half that of the outer loop. Also, both $a_1$ and $a_2$ are small compared to the axial field reversal point z1 which may be typically 10 meters for regulatory reasons. Under these assumptions, the excitation levels are approximately given by:

$$(N_1 I_1) \approx \left(\frac{a_2}{a_1}\right)^2 (N_2 I_2) \quad (3)$$

In an EAS application of the antenna system with the configuration of FIG. 2, the antennas thereof are disposed on each side of an area to be placed under surveillance and each antenna serves in both transmit and receive modes, i.e., in transceiver nature. A similar four term equation can be written for the four coil transceiver geometry which is of particular interest for EAS purposes. However, this is simply an expansion of Eq. (3). This implies that the inner coil dominates the fields near the array while the outer coil causes cancellation at a distinct point z1. Due to the similar shapes of the two coils, the field distribution at a distance is similar, leading to enhanced cancellation.

Figure 1:
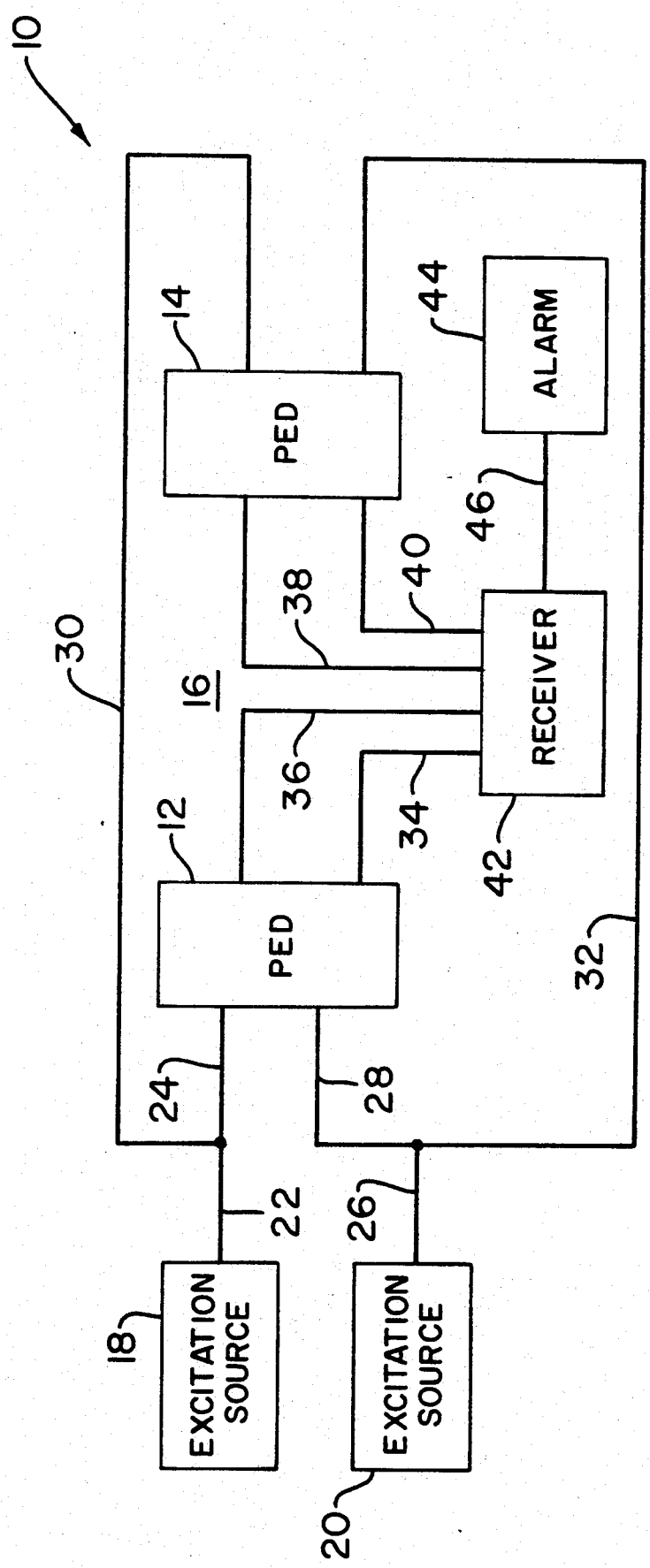
FIG. 1 is a functional block diagram of an EAS system employing an antenna system in accordance with the invention.

Referring now to FIG. 1, an EAS system 10 includes left pedestal 12 and right pedestal 14 respectively aside area 16 subject to surveillance and each pedestal incorporates an antenna of the FIG. 2 configuration.

The subject antenna system includes excitation sources 18 and 20, which provide excitation for driving the antennas of pedestals 12 and 14 at a preselected operating frequency, i.e., the sources provide alternating current to the antennas. Source 18 is connected over lines 22 and 24 to pedestal 12 and source 20 is connected by lines 26 and 28 to pedestal 12. Pedestal 14 has connection to source 18 by line 30 and to source 20 by line 32. Interiorly of the pedestals, connections are made from lines 24 and 30 to the outer coils OC and connections are made from lines 28 and 32 to the inner coils IC.

Lines 34, 36, 38 and 40 connect pedestals 12 and 14 to receiver 42 which controls alarm output unit 44 over line 46.

Figure 3:
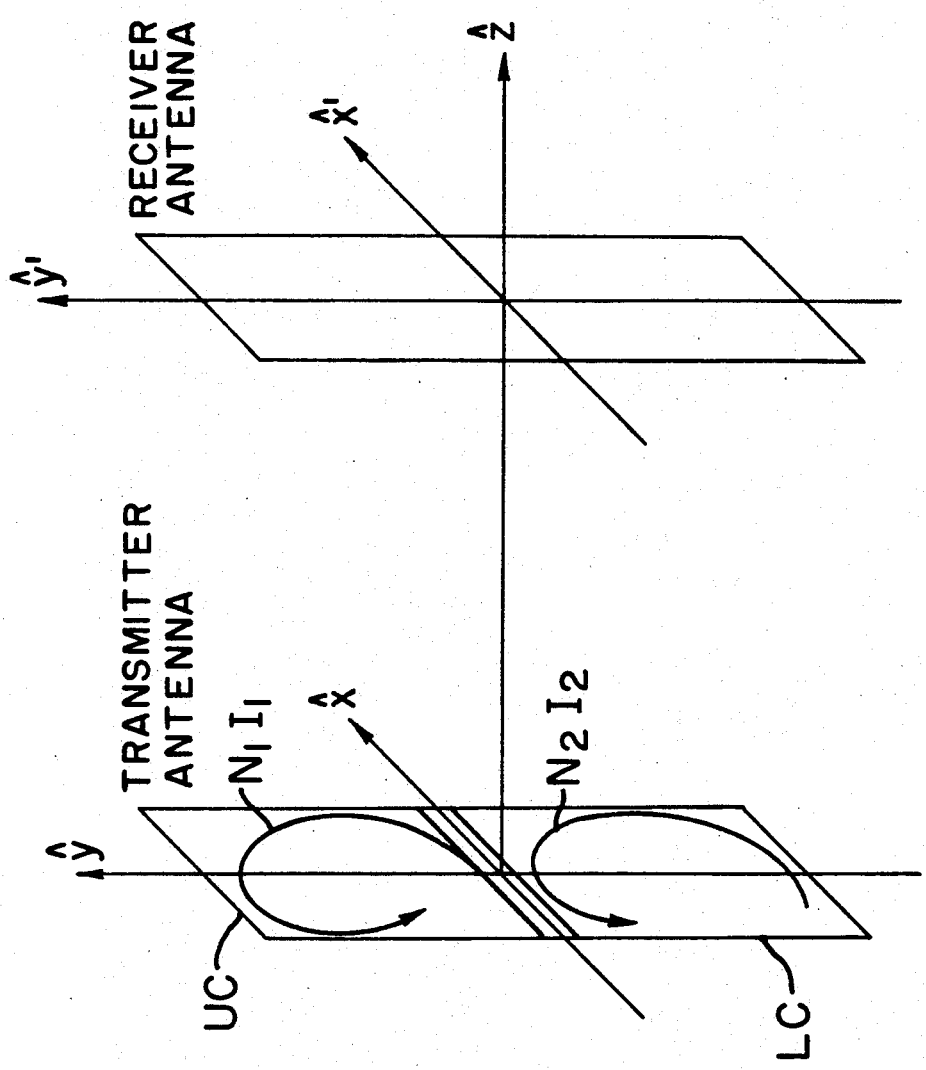
FIG. 3 is a schematic showing of a prior art Figure-8 transmitting and receiving antenna array.

Incorporating reference is hereby made to the aforementioned U.S. Pat. Nos. 4,510,489 and 4,510,490 for disclosure of the manner of operation of the EAS systems thereof. As is seen in the referenced patents, a magnetoelastic sensor is excited by a transmitter antenna in the configuration of FIG. 3. Such configuration will be seen to include an upper coil UC and a lower coil LC, each of generally rectangular shape and disposed in juxtaposition at their respective lower and upper courses. The coils are excited at the same phase to the same level N1I1. The transmitter antenna is placed on one side of the area under surveillance and a receiver antenna of configuration akin to that of the transmitter antenna is placed on the other side of the area under surveillance.

For optimum detection of the magnetoelastic sensor or target, the transmitter field level should be less than or about 0.25 Gauss, and rapidly fall off in field level outside of the surveillance area (interrogation zone), both for zone control and regulatory reasons.

The target, once excited by the field, oscillates continuously at a predetermined resonant frequency after the transmitter field is abruptly turned off. The target resonant frequency Fr is given by:

$$Fr = \left(\frac{1}{2\pi l}\right)\left(\frac{E}{\rho_m}\right)^{\frac{1}{2}} \quad (4)$$

where l is the target length, E is Young's modulus, and $\rho_m$ is the mass density of the target material. As is known from the referenced patents and further from a commercial system of the assignee hereof, known as the Ultra*Max ® system, Allied 2826MB alloy as cast is used for the target with a length of about 1.5 inches, producing a resonant frequency of about 58 KHz. The mass density is typically about 7.8 gm/cc and Young's modulus is a function of dc bias field produced by a bias permanent magnet.

The system electronics detects the target signal, i.e., a signal returned at the predetermined resonant frequency, through one or more receiver coils, in the absence of the transmitter field. Upon confirming detection of a target, an alarm is then engaged by the system electronics, indicating unauthorized transport of the target through the interrogation zone.

System 10 of FIG. 1 operates with targets of the foregoing type and with like system electronics for target detection and alarm indication. However, system 10 incorporates the diverse antenna configuration of FIG. 2 and opposite phase excitation of the inner and outer antenna coils.

As a numerical simulation, the following results were calculated using the three-dimensional (3D) Biot-Savart integral equation code using 100 line elements per coil. This gave the smoothest and most accurate results compared to the two-dimensional (2D) finite element techniques for the on-axis fields without shielding.

Figure 4:
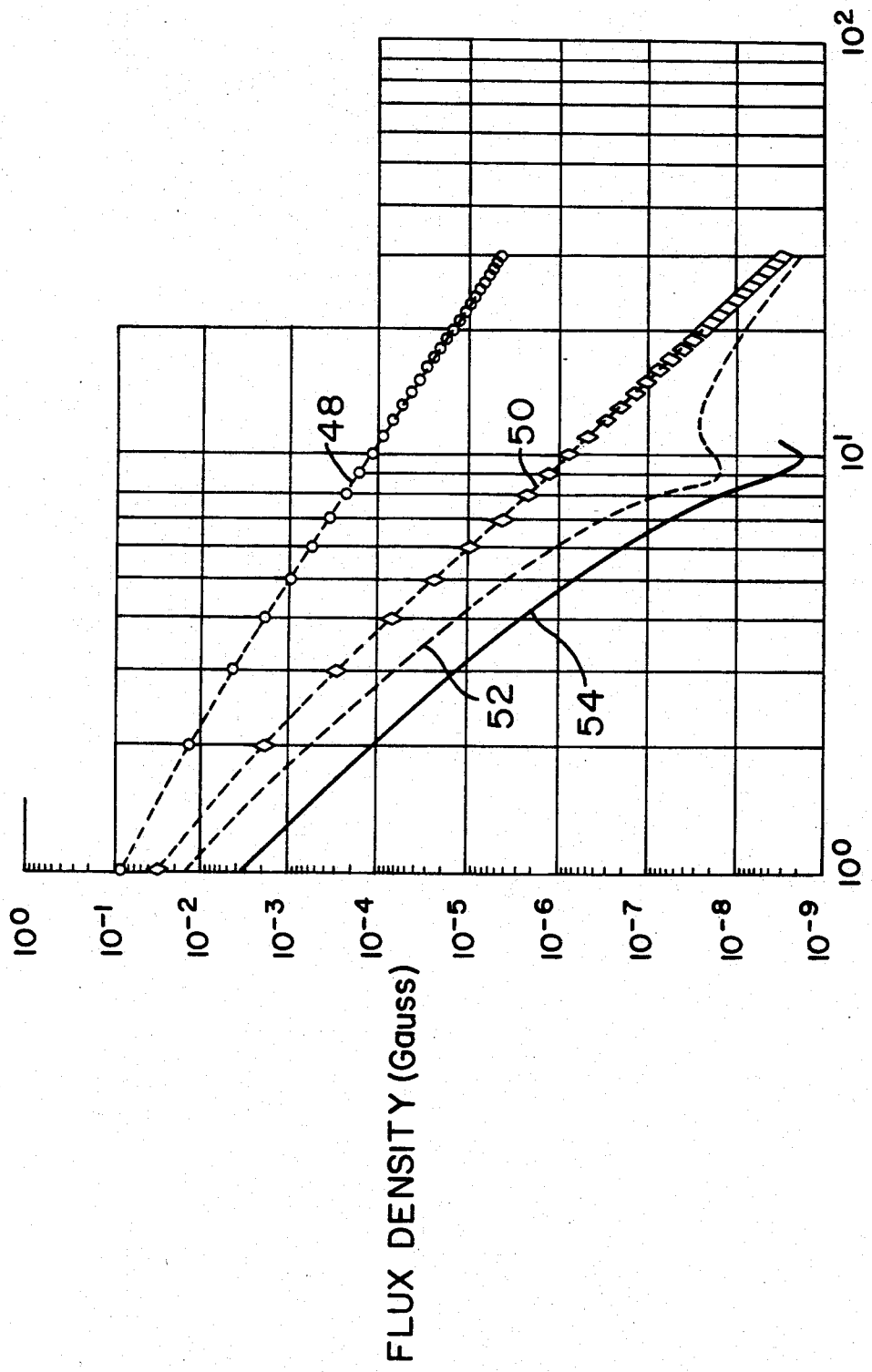
FIG. 4 is a theoretically determined plot of flux density with distance from the transmitting antennas of FIGS. 2 and 3.

Referring to FIG. 4, theoretically computed profiles are set forth showing a comparison of axial field vs. distance for various antenna configurations in the above described system environment. Curve 48 is that computed for the above-discussed prior art antenna having juxtaposed and generally rectangular coils, separately excited and in phase. Curve 50 is that computed for the prior art antenna of the Figure-8 type, the loops of which are excited out of phase from a common excitation source. Curve 52 is that computed for the antenna system configuration of FIG. 2 in accordance with the invention. Curve 54 is that computed for the antenna system configuration of FIG. 2, with a magnetic shield applied thereto as below discussed.

As will be seen from FIG. 4, curves 52 and 54 exhibit substantially more rapid falloff of the field with distance than do curves 48 and 50. Further computational analysis establishes that the interrogation zone fields for the vertical and horizontal orientations in the midplane of the antennas compared are substantially more uniform for antenna system configurations in accordance with the subject invention than for the prior art configurations.

Figure 5:
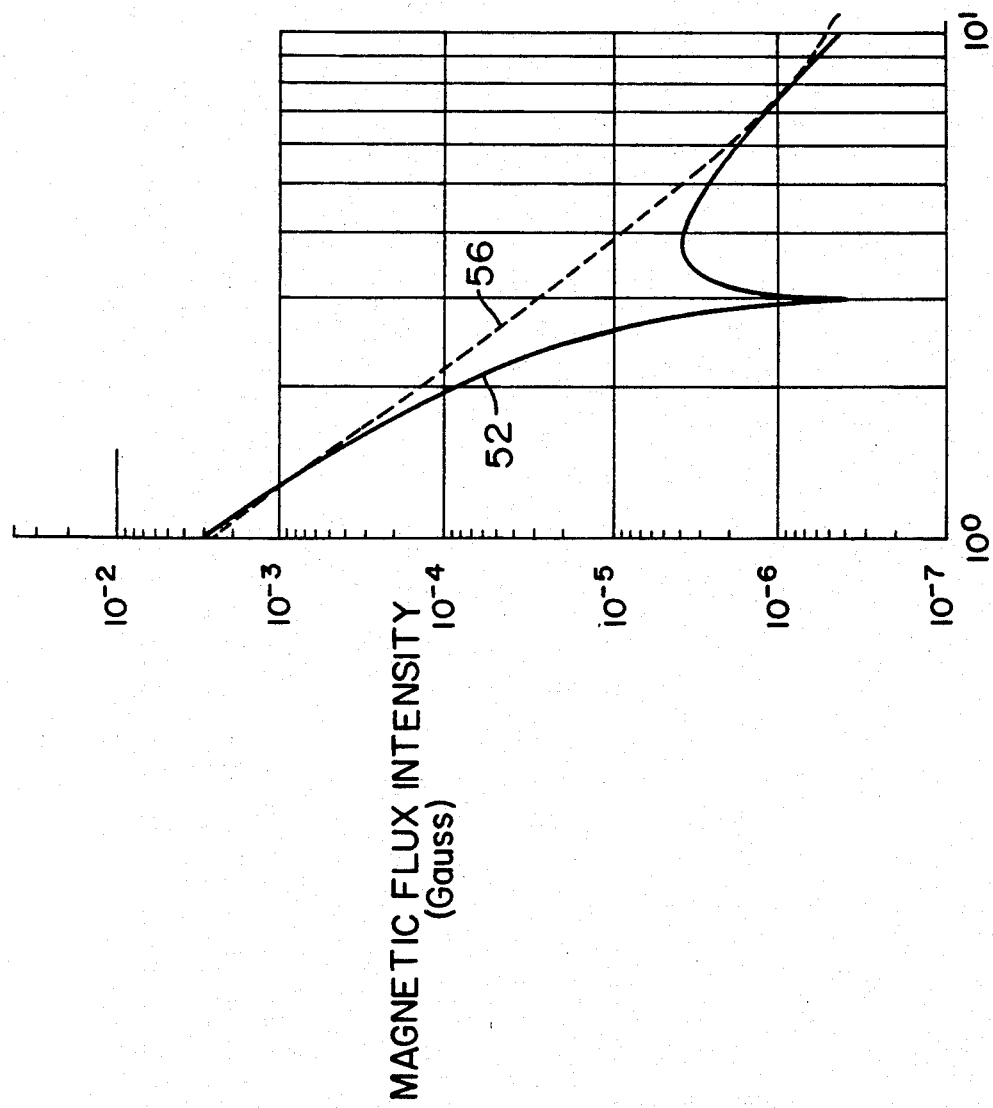
FIG. 5 is a showing of an actually measured plot of flux density with distance from the transmitting antennas of FIG. 2 depicted jointly with the corresponding theoretical plot from FIG. 4.

Turning now to FIG. 5, the plot thereof depicts in solid line the curve 52 of FIG. 4. Curve 56 is experimentally derived and will be seen to correspond in general outline with the short and long distance from antenna field strengths of curve 52. The notch in curve 52 is not discernible in the experimentation, presumably involving errors in the experimentation due to inability to discern background noise influences.

Curve 54 of FIG. 4 was obtained by adding a thin laminated (split) magnetic shield. The use of the shield, indicated schematically as S1 in FIG. 2, behind the coils for each array approximately three inches or less therefrom is found to improve the overall results. The condition for the field reversal is required to be altered since the innermost coil is more effectively shielded than the outermost coil. The shield parameters are generally as those described in U.S. Pat. No. 4,769,631 to which incorporating reference is made. In this case, the magnetic shield material should have the following properties: (1) $\mu_r$ (relative permeability) is at least one hundred at the operating frequency; (2) shield thickness (d) is large enough to prevent saturation (typically, d is less than one tenth of an inch); (3) for an unlaminated shield, the resistivity $\rho$ is preferably: $(\rho/\mu) > (\pi d^2 F/10)$, although lower values will work, but less efficiently; and (4) for a laminated (or split) shield built of multiple layers or a layer with various horizontal or vertical cuts, the condition for resistivity given in (3) above need not be imposed as such and can be relaxed.

Figure 6:
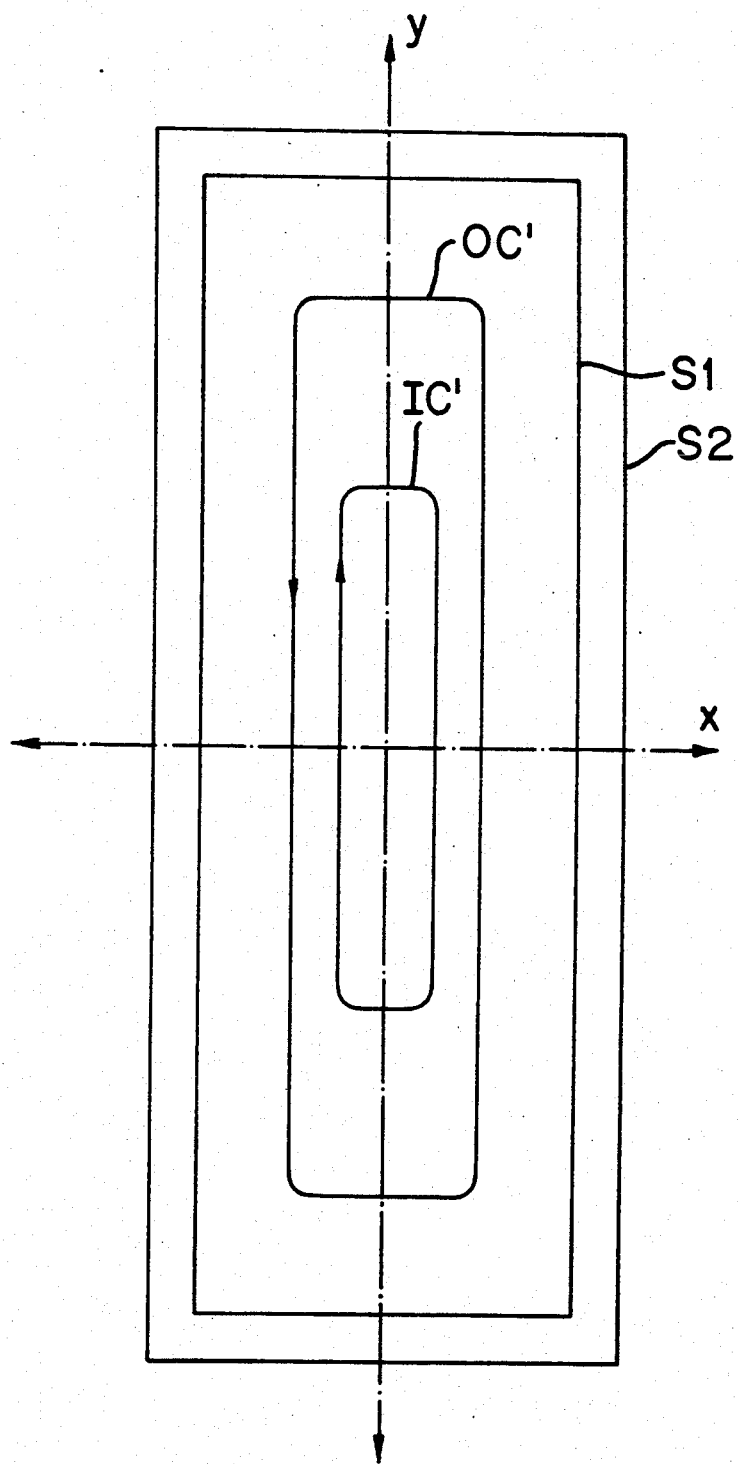
FIG. 6 is a schematic showing of an alternative configuration for an antenna system in accordance with the invention.

Referring now to FIG. 6, an alternative configuration for use in practicing the invention is shown to include generally oval inner coil IC' and like-shaped and concentrically disposed outer coil OC' with coil excitations respectively opposite in sense as indicated by the arrows on the coils. Magnetic shield S1 is again shown rearwardly of the coils, which again are disposed in a common plane. S2 identifies an electrically conductive shield which may be disposed rearwardly of and in contiguous relation with magnetic shield S1. Shield S2 is likewise usable in the embodiment of FIG. 2 and its electrical characteristics and function are as described in the incorporated '631 patent.

The ratio of the excitation level of the inner coil to that of the outer coil, without shielding, is in the range of about two to three in accordance with the invention. Where shielding is employed, the ratio of the excitation level of the inner coil to that of the outer coil is somewhat higher than without shielding.

Various changes may be introduced in the foregoing practices of the invention and in the system embodiments without departing from the invention. Thus, the circular and generally oval antenna coil configurations may otherwise be elliptical, rectangular, etc. Accordingly, the particularly described preferred methods and apparatus are intended in an illustrative and not in a limiting sense. The true spirit and scope of the invention is set forth in the appended claims.

What is claimed is:

1. An antenna system, comprising at least first and second antennas circumscribing a common center thereof and having respective numbers of turns $N_1$ and $N_2$ at respective first and second distances $a_1$ and $a_2$ from said common center, said second distance being greater than said first distance, and means for excitation of said first antenna at a first current level $I_1$ and of said second antenna at a second current level $I_2$, the excitation of said first and second antennas by such exciting means being of respective opposite phasing, the product of $N_1$ times $I_1$ being approximately equal to the product of $N_2$ times $I_2$ times the square of $a_2/a_1$.

2. The invention claimed in claim 1 wherein said first and second antennas are circular.

3. The invention claimed in claim 1 wherein said first and second antennas are generally oval.

4. The invention claimed in claim 1 wherein said first and second antennas are electrically conductive coils.

5. The invention claimed in claim 1 wherein said first and second antennas are disposed in a common plane.

6. The invention claimed in claim 1 wherein said excitation means excites said first antenna and said second antenna at a respective excitation ratio in the range of about three to one.

7. The invention claimed in claim 1 wherein said excitation means excites said first antenna and said second antenna at a respective excitation ratio in the range of about two to one.

8. The invention claimed in claim 1 further including a magnetic shielding member disposed at a common plane of each of said first and second antennas.

9. The invention claimed in claim 8 wherein said excitation means excites said first and second antennas at a preselected operating frequency and wherein said magnetic shielding member is comprised of a shielding material having a relative permeability which is at least one hundred at said operating frequency.

10. The invention claimed in claim 8 wherein said shielding member is unlaminated and wherein the resistivity thereof is governed by the relationship $(\rho/\mu) > (\pi d^2 f/10)$, where $\rho$ is the resistivity of the material constituting the shielding member, $\mu$ is the relative permeability of the material constituting the shielding member, d is the thickness of the shielding member and f is said preselected operating frequency.

11. The invention claimed in claim 8 further including an electrically conductive shield in juxtaposition with said magnetic shielding member.

12. The invention claimed in claim 1 wherein said first and second antennas constitute a first antenna array, said system further including a second antenna array, said second antenna array comprising at least third and fourth antennas circumscribing a common center thereof and having respective said numbers of turns $N_1$ and $N_2$ at respective said first and second distances $a_1$ and $a_2$ from said common center of said third and fourth antennas, and means for excitation of said third antenna at said first current level $I_1$ and of said fourth antenna at said second current level $I_2$, the excitation of said third and fourth antennas by such exciting means being of respective opposite phasing, said product of $N_1$ times $I_1$ being approximately equal to the square of $a_2/a_1$ times the product of $N_2$ times $I_2$ applying also to said third and fourth antennas, said second antenna array being disposed in spaced facing relation to said first antenna array and propagating energy in a direction opposed to the direction in which said first antenna array propagates energy.

13. The invention claimed in claim 12 wherein said first, second, third and fourth antennas are circular.

14. The invention claimed in claim 12 wherein said first, second, third and fourth antennas are generally oval.

15. The invention claimed in claim 12 wherein said first, second, third and fourth antennas are electrically conductive coils.

16. The invention claimed in claim 12 wherein said first and second antennas are disposed in a first plane and wherein said third and fourth antennas are disposed in a second plane and wherein said first and second planes are parallel to one another.

17. The invention claimed in claim 12 further including a magnetic shielding member disposed aside each said antenna array on sides thereof in non-facing relation.

18. The invention claimed in claim 17 wherein said excitation means excites said antenna arrays at a preselected operating frequency and wherein each said shielding member is comprised of a shielding material having a relative permeability which is at least one hundred at said operating frequency.

19. The invention claimed in claim 17 wherein each said shielding member is unlaminated and wherein the resistivity thereof is governed by the relationship $(\rho/\mu) > (\pi d^2 f/10)$, where $\rho$ is the resistivity of the material constituting the shielding member, $\mu$ is the relative permeability of the material constituting the shielding member, d is the thickness of the shielding member and f is said preselected operating frequency.

20. A method for propagating electromagnetic radiant energy, comprising the steps of:
   (a) locating first and second multi-turn antennas circumscribing a common center thereof at first and second respective different distances from said common center thereof; and
   (b) simultaneously providing excitation alternating currents to said first and second antennas in correspondence to the number of turns thereof and to said first and second distances so as to provide first alternating fields adjacent said antennas to a predetermined distance therefrom which are essentially controlled by said first antenna and to provide second alternating fields beyond said predetermined distance which are of lesser field strength than said first fields, said second fields being determined by both of said first and second antennas.

21. The method claimed in claim 20 including the further steps of:
   (c) providing a magnetic shielding member with thickness thereof selected such that when the shielding member is placed at a common plane of said first and second antennas the shielding member is not saturated by said excitation currents; and
   (d) disposing said shielding member at said common plane of said first and second antennas.

22. The method claimed in claim 21 including the further steps of:
   (e) locating third and fourth multi-turn antennas at third and fourth respective different distances from a center common to each of said third and fourth antennas and circumscribed thereby;
   (f) providing excitation currents to said third and fourth antennas in correspondence to the number of turns thereof and to said first and second distances so as to provide first fields adjacent said antennas to a predetermined distance therefrom which are essentially controlled by said third antenna and to provide second fields beyond said predetermined distance which are of lesser field strength than said first fields, said second fields being determined by both of said third and fourth antennas;
   (g) providing a further magnetic shielding member with thickness thereof selected such that when the shielding member is placed at a common plane of said third and fourth antennas the further shielding member is not saturated by said excitation currents; and
   (h) disposing said further shielding member at said common plane of said third and fourth antennas.

* * * * *

UNITED STATES PATENT AND TRADEMARK OFFICE
CERTIFICATE OF CORRECTION

PATENT NO. : 5,218,371
DATED : June 8, 1993
INVENTOR(S) : Richard L. Copeland, et al.

It is certified that error appears in the above-identified patent and that said Letters Patent is hereby corrected as shown below:

Col. 1, line 35.   Change "ar" to -- are --

Col. 2, line 13.   Change "sheared" to -- shared --

Col. 2, line 49.   After "antennas." insert -- For such joint antenna field determination, the antennas are of course excited simultaneously. --

Col. 2, line 60.   Change "$(d < \lambda/2\pi)$" to -- $(d << \lambda/2\pi)$ --

Col. 4, line 52.   Change "l" to -- $\ell$ --

Signed and Sealed this

First Day of February, 1994

Attest:

BRUCE LEHMAN

Attesting Officer   Commissioner of Patents and Trademarks